United States Patent [19]
Moulart et al.

[11] Patent Number: 6,031,912
[45] Date of Patent: Feb. 29, 2000

[54] PROCESS AND DEVICE FOR PERMITTING SELECTIVE ACCESS TO A SECURITY SYSTEM

[75] Inventors: Yves Moulart, Brussels; Michel Dawirs, Wezembeek Oppem, both of Belgium

[73] Assignee: Banksys, Brussels, Belgium

[21] Appl. No.: 08/793,281

[22] PCT Filed: Sep. 8, 1995

[86] PCT No.: PCT/BE95/00080

§ 371 Date: Mar. 5, 1997

§ 102(e) Date: Mar. 5, 1997

[87] PCT Pub. No.: WO96/07994

PCT Pub. Date: Mar. 14, 1996

[30] Foreign Application Priority Data

Sep. 9, 1994 [BE] Belgium ................................ 9400813

[51] Int. Cl.[7] ................................................. H04L 9/00
[52] U.S. Cl. ................................................................ 380/44
[58] Field of Search ................................. 380/37, 44, 46; 340/825.31

[56] References Cited

U.S. PATENT DOCUMENTS 4,074,066  2/1978  Ehrsam et al. .............................. 380/49
4,847,614  7/1989  Keller .................................. 340/825.31
4,944,008  7/1990  Piosenka et al. .......................... 380/46

FOREIGN PATENT DOCUMENTS

| 0 171 323 | 2/1986 | European Pat. Off. . |
| 0 265 728 | 5/1988 | European Pat. Off. . |
| 0 372 285 | 6/1990 | European Pat. Off. . |
| 37 06 954 A1 | 9/1988 | Germany . |
| WO 90/15211 | 12/1990 | WIPO . |

Primary Examiner—Salvatore Cangialosi
Attorney, Agent, or Firm—Dorsey & Whitney LLP

[57] ABSTRACT

A process and arrangement that gives selective access to a security system, particularly in a payment system using debit cards, credit cards, or withdrawal of funds contained in a so-called smart card, and in particular on a chip card. The system comprises at least one first device and at least one second device that must be used in a correct configuration with one another in order to gain access. Access is gained by verifying that a certain coded key K2, held in the second device, is recognized as being valid by the first device, after comparing it with a renewing key K1 and previous versions of the code key K1 contained in the first device.

20 Claims, 1 Drawing Sheet

PROCESS AND DEVICE FOR PERMITTING SELECTIVE ACCESS TO A SECURITY SYSTEM

TECHNICAL FIELD

This invention relates to selective access to a security system, and in particular to a payment system using debit cards, credit cards, or for the withdrawal of funds contained on a so-called smart card, and in particular for chip cards.

BACKGROUND OF THE INVENTION

The system with which the present invention is concerned, comprises at least one initial device and at least one second device that must be brought into a correct configuration with the initial device in order to obtain access. Access is obtained by verifying that a coded key associated with the second device is recognized as valid by the first device, after comparison with a key found in the first device.

By way of example, in the case of payment systems with which it is possible to withdraw funds recorded on a credit card, which are referred to as an "electronic purse" and which contains the second device described above, the first device has payment terminals, each of which has one or more so-called "global" coded keys that are common to various payment terminals. Each electronic purse, in addition to any security codes, contains a memory for the monetary funds which may be withdrawn a little at a time or all in one sum, and then reloaded, e.g. by means of a bank computer terminal, as well as a memory for one or more coded keys. The description of a coded key below is given by way of clarification. One or more other keys may be used, or some other appropriate procedure may be employed.

When a payment is to be made, the electronic purse or card must communicate with a payment terminal. The payment terminal, before permitting the withdrawal of funds from the electronic purse, and possibly also for the purpose of double-checking the security codes, calculates the supposed key of the card on the basis of the global key in the terminal and on the basis of a code that identifies the individual card (for instance its serial number). The terminal then checks that this supposed key corresponds to that stored in the electronic purse card and check that it has been loaded at the time of production or issue. This calculation is carried out on the basis of a chosen algorithm that cannot be reversed. That is, if one knows the card's key and its code, it is not be possible to discover the global key.

Although this irreversible calculation does not make it possible for a third party to decipher the key and the card code in order to identify the global key, that third party could attempt to obtain the global key found in various terminals by some fraudulent means, and on the basis of that key to calculate the keys of all the cards in the system, thus obtaining or inventing their identifying codes, and then to issue false electronic purse cards which would be indistinguishable from genuine cards. Such actions would be prejudicial to the company and very costly to monitor and combat. Under extreme circumstances, these fraudulent actions could result in the need to stop using the aforesaid system.

SUMMARY OF THE INVENTION

This invention is aimed at limiting the falsification of electronic purse cards of the type described above and thus at eliminating the serious disadvantages that would result.

To limit this, and thus to increase the security system, it is necessary to be able, in a programmed fashion, to change the global key used by the payment terminals, and this is easily effected since these terminals are regularly linked to a management center. However it is also necessary to update the key stored in the electronic purse cards in use in the system; but these are not all presented with sufficient regularity to a payment or bank terminal for their coded keys to be changed in a "synchronized" fashion with those of the payment terminals.

To resolve this problem of synchronized changing, the process contemplated by this invention involves:

A successive renewal, at chosen intervals, of the first device's key. This new key is linked to the previous one by an irreversible function whereby, from a given key, it is only possible, in each instance, to obtain the preceding key in the renewal sequence and, by repeating the function, any previous keys.

If the comparison of the renewed key of the first device and the key of the second device does not indicate that the latter is valid, a successive search, by means of the repeated irreversible process, of the previous keys of the first device can be performed, in order to compare the previous keys with that of the second device; and If this successive comparison does not verify the validity of the key of the second device, access can be barred.

This invention also covers a device for implementation of the preceding process, the device comprising at least one initial device and at least one second device, where:

The second device contains the means for storing a key;
The first device contains:
Storage means for storing a key;
Production means for producing a new key for the first device. The production means is linked with the means for storing for the purpose of replacing the key by the new key. The key is linked to the preceding key by an irreversible function whereby, on the basis of a given key, it is only possible in each instance to obtain the preceding key in the renewal sequence and, by repeating the function, any other previous keys;
Repetition means for repeating the irreversible function in order to find the previous keys of the first device. The repetition means is linked to the production means and/or to the storage means;
Comparison means for comparing the renewed keys and the previous keys of the first device to the key of the second device. The comparison means are linked to the storage means and the repetition means;
Means of barring access, linked to the comparison means; and
Replacement means for possibly replacing the stored key in the storage means of the second device with a more recent key in the key renewal sequence. The replacement means are linked to the repetition means and to the access barring means.

Other details and special features of the invention are apparent from the description and illustrative drawing herein of a preferred embodiment, which is a non-exhaustive example of the process and one particular form of the facility made possible by the invention in the context of an electronic purse payment system.

DETAILED DESCRIPTION OF A PREFERRED EMBODIMENT

Figure 1:
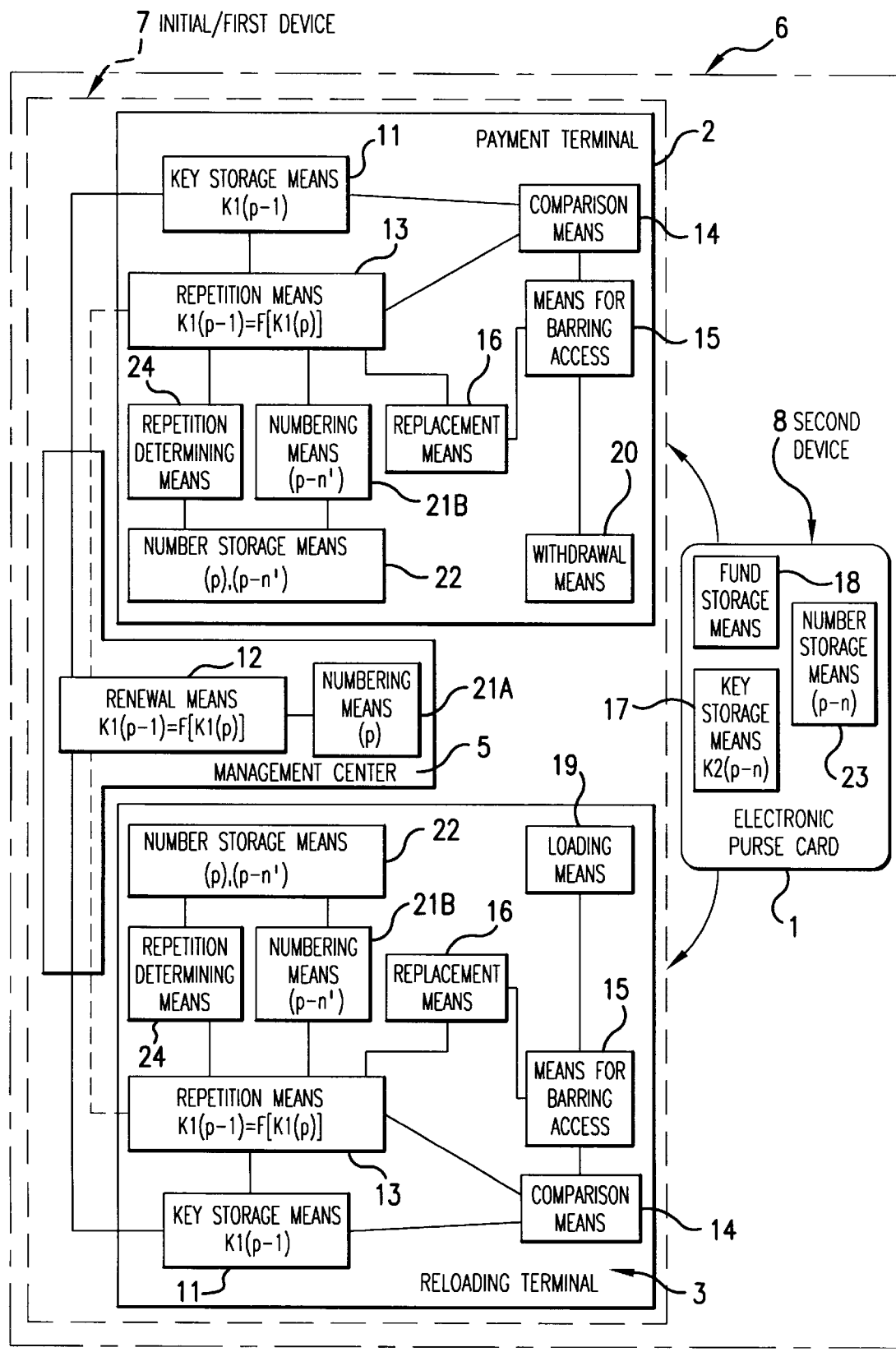
FIG. 1 represents a simplified functional layout of a security system which implements a process and a facility made possible by the invention.

With reference to FIG. 1, the process contemplated in the invention may be used to advantage for such purposes as enhancing the security of an electronic purse payment system 1 (which may take the form of a so-called chip card) and may be used alone or in combination with other security processes. A known method of increasing this type of security is to change the system's global key at planned intervals. This change is facilitated for a payment terminal 2 and for a terminal 3 which reloads the electronic purse card 1, used respectively for the electronic withdrawal, in the context of a payment by this method, of the "money" recorded on the electronic card, and for replenishing the funds available on the card, withdrawing the corresponding funds from a bank account, for instance. In effect, the payment terminal 2 and the reloading terminal 3 are regularly in communication with the payment and security system's management center 5, comprising the aforesaid listed components 1 to 5, which are thus able to organize the change of keys.

The case of the electronic purse card 1 is a special one, however, due to the fact that it may not be used regularly and that between two successive uses several changes may have taken place in the global key used in the payment terminals 2, resulting in the card containing a lapsed key.

To resolve this problem one could require that the bearer of such an electronic purse card 1 have his card validated, for example by means of a bank or reloading terminal 3 before authorizing a new use for payment by means of a payment terminal 2. However, the bearer of this electronic card 1 will only become aware that the card is no longer valid, and needs to be validated, when a payment is refused, e.g. in a store, with the consequences one can readily imagine, even though the bearer is attempting to use the card 1 in good faith. This situation would soon discourage the use of the payment system 6. The present invention avoids this type of inconvenience, at least in the majority of cases.

The payment and security system 6 can be regarded as comprising an initial device 7 which includes, among other things, a management center 5, at least one payment terminal 2 and at least one reloading or bank terminal 3, and a second device 8 which consists primarily of the electronic purse 1 made, for example, in the form of a so-called chip card.

To improve the security of the system, the process contemplated by this invention envisages a successive renewal, at chosen intervals of time, of the global key K1 stored in the first device 7. That is, the renewal is effected in all the payment terminals 2 and reloading terminals 3, for example, from the management center 5, in the context of its regular communication with these terminals 2, 3. A new global key $K1(p)$ stored in the payment terminal 2 for a period of time (p) is linked to the preceding global key $K1(p-1)$ relating to the immediately preceding period $(p-1)$ on the basis of an irreversible function F whereby, on the basis of the determined key $K1(p)$, it is only possible in each instance to obtain the key $K1(p-1)$ that comes immediately before it in the renewal sequence of the key K1. By repeating this function F, one can then also obtain the key $K1(p-2)$ on the basis of the key $K1(p-1)$, and so on.

According to the invention, if the key $K2(p-n)$, where n is a whole number equal to or greater than zero, of the electronic purse card 1 is not regarded as valid when the comparison is carried out during period (p) on key $K1(p)$ of the payment terminal 2, a successive search is carried out, each time through the irreversible function F, in order to establish, one at a time, the preceding keys $K1(p-1)$, $K1(p-2)$, etc., used by the security system 6 so as then to compare them individually with the key $K2(p-n)$ of the aforesaid electronic purse card 1.

If the successive comparison verifies the key $K2(p-n)$ to be valid, for example if it is equal to $K1(p-n)$, and, where relevant, if any other conditions of access are satisfied, access to the withdrawal of funds from the electronic card 1 is authorized so that the terminal 2 can effect a payment for a sum up to the maximum contained on the electronic purse card 1. If the successive comparison fails to verify the validity of the key $K2(p-n)$, instructions is given for barring the withdrawal of funds.

Ideally, if the successive verification determines the validity of the electronic purse card's key $K2(p-n)$, the process covered by this invention makes provision for the replacement of this key $K2(p-n)$ by one of the more recent keys of the payment terminal 2. The new key inserted into the said electronic purse card could be the key $K2(p)$ corresponding to the key $K1(p)$ of the payment terminal in- period (p) with respect to the accepted withdrawal. It might however be preferable to insert into the electronic purse card 1 a key $K2(p-1)$ corresponding to the key $K1(p-1)$ for the period $(p-1)$ preceding it in the succession of key renewals. Thus, if another payment terminal 2 in the system 6 has not yet submitted its latest update and still has the key $K1(p-1)$ in its memory, and if the electronic purse card 1 which has just been given the new key $K2(p-1)$ is used in conjunction with this other terminal 2, the validity of the electronic purse card would not be challenged. This validity would not however be recognized if the electronic purse card 1 had contained a key $K2(p)$ and the other terminal 2 a key $K1(p-1)$, since the function F is irreversible and uses the key $K1(p-1)$ of the other terminal 2 to move backwards in search of the preceding keys. The function F does not make it possible to determine a future key, nor does it permit use of the key $K2(p)$ of the electronic purse card 1 to determine the preceding keys.

An advantage of the process contemplated by the invention is that the searches and successive comparisons of previous keys $K1(p-n)$ in the security system are barred as from a certain maximum permitted degree of age in (a whole number above zero). At the moment the system 6 can now only deal with the keys $K1(p-n)$ for which $0 \leq n \leq m$, in order to:

prevent a validation, by the payment terminal 2, of an electronic purse card 1 which has not been in use for a long time, with the possibility of its successive validation by a bank terminal or by a reloading terminal 3 after ascertaining that the card is not being used fraudulently; and restrict to the maximum any proliferation of a fraudulent electronic purse card 1 being used on the basis of an old key $K2(p-n)$ and which users conscious of the fraud would not present for validation inspection, whereas users not conscious of any fraud, by presenting it for validation, could help with the uncovering of fraud.

The comparison of the keys $K1(p-n)$ and $K2(p-1)$ may be immediate, in terms of their being identical or coinciding. This comparison may be indirect and then, for instance, the function F uses an additional code stored on the electronic purse card 1, or again the result of the function F may be handled by another function using this auxiliary code or some other parameter, etc.

The sequential numbers (p), (p-1), . . . (p-n), etc., given above to the keys K1 and K2 are only an indication of their order of succession. According to one method of implementing the invention, the keys K1 and K2 are recorded in their various locations without any sense of sequential numbering, and the search for, and comparison of, the coinciding keys K1 and K2 is carried out without any form of guide. Under another form of implementation, sequential numbers (p−n) are given to the keys K1, K2 used successively and linked by the irreversible function F. At the same time as the key K1, K2 is stored in the first or second device respectively 7, 8, the sequential number (p−n) of the key K2 (p−n) is used for the successive search for the key K1(p−n) for the sake of comparison, i.e. in order to find out how many times the function F is to be repeated. This sequential number may also be used for determining at once, without any is search or comparison, the degree of age n of the electronic purse card 1 in relation to the aforesaid period (p) and for comparing this degree of age with a maximum permitted degree of age m beyond which the said searches and comparisons are barred.

Anyone experienced in this art will appreciate that, because of the irreversible function F, at the management center a "last" coded key K1(end) is set up, and this in principle will be the key of the last period of life, if not of the whole security system 6, then at least of the whole of the keys K1(p) and K2(p) linked by the function F, and possibly also of the function F itself. Finally, the function F is applied to this key K1(end) to obtain the key K2(end-2) and so on until one obtains the K1(1) of what has been chosen as the first period. This key K1(1) is then loaded in the payment terminal 2 and, as appropriate, into the reloading terminal 3 and its counterpart for this first period K2(1) is loaded onto the electronic purse card 1 when it is made or issued. The management center 5 keeps secret either the whole series of keys K1(p), K1(1) to K1(end), thus obtained, or at least the last K1(end) on the basis of which any of the previous keys K1(p) might be reaccessed.

The total number of keys K1(p) in the series must be chosen in order that the life of the security system 6, in terms of the coded key, is less than the sum of the corresponding periods or, if the successive periods (p) are of the same duration, than the product of the duration of a period and the total number of keys K(p).

One application of this invention for implementation of the process contemplated therein could involve a simple form of creating a first device 7 mentioned above and comprising, for instance, the components 2, 3 and 5 referred to. This first device 7 also consists of:

Key storage means 11 (or a memory) for storing the key K1(p−1) for a period (p−1). The key storage means 11 are provided, for instance, in the payment terminals 2 and in the reloading terminals 3; it also being possible for these means to store the keys K1(p−n) relating to at least certain previous successive periods in order to limit too frequent a repetition of the function F.

Renewal means 12 for producing a new key K1(p) for the following period (p), for the first device 7. The production means 12 are ideally provided at the management center 5 and linked to the storage means 11 in order to be able to replace there a key K1(p−1) by the new key K1(p), so that the latter can be linked in each instance to the previous key K1(p−1) by the aforesaid irreversible function F.

Repetition means 13 for repeating the irreversible function F, linked to the aforesaid production means 12 and/or to the storage means 11, in order successively to reaccess the previous keys K1(p−n) of the first device 7.

Comparison means 14 for comparing the renewed keys K1(p) and of the key K2(p−n) of the second device 8. The comparison means 14 is linked to the storage means 11.

Means 15, linked to the comparison means 14, for barring access to the withdrawal of funds from an electronic purse card 1 which has not been validated.

Replacement means 16 for the purpose of replacing, in the storage means 17 of the second device 8, the key K2(p−n) stored by a more recent key K2(p−n') in the successive renewal of keys. The replacement means 16 are linked to the repetition means 13, for the purpose of receiving a key replacement order, and to the means 15 for barring access, for the purpose, where relevant, of barring the replacement of a key K2(p−n) that is judged to be too old.

The implementation of the invention also involves the second device 8, already explained above, which consists of the storage means 17, which, for the purpose of the reading and recording of the key K2(p−n), may be used in conjunction with terminal 2 or 3. Moreover, when an electronic purse card 1 is involved, the second device 8 consists of a funds storage means 18, of a non-permanent nature, for the "electronic funds" intended:

for the loading of electronic funds by means of the loading means 19, which forms a part of the loading terminal 3 and which may be released by the means of barring access 15 of the latter at the time of validation of the card 1 by this terminal 3; and for the withdrawal of electronic funds through the means of withdrawal 20, which forms a part of the withdrawal terminal 2 and which may be released by the means 15 for barring access of the latter at the time of validation of the card 1 by this terminal 2.

Under one advantageous form of implementation of the invention, the above arrangement would also have:

Numbering means 21A, 21B whereby each new key K1(p) is given a sequential number (p) in the sequence of production of the keys. The initial numbering means 21A is possibly linked to the above-mentioned production means 12 and situated in the management center 5 in order to supply the number (p) of the new key K1(p) for the period (p). The second numbering means 21B is possibly linked to the repetition means 13 in order to obtain therefrom the sequential number (p−n') of a more recent key K2(p−n') chosen to replace the key K2(p−n) stored in the storage means 17;

In the first device 7, in the terminals 2 and 3, storage means 22 for storing at least the sequential number (p) of the last key stored K1(p). The storage means 22 are possibly able to delete one or more of the earlier sequential numbers of the deleted keys and linked to the means of numbering 21A and possibly also 21B for the purpose of receiving from the latter the appropriate sequential number (p−n');

In the second device 8, storage means 23 for storing the sequential number (p−n) of the key K2 (p−n) stored in the storage means 17. The storage means 23 are possibly used in conjunction with the numbering means 21B for receiving the sequential number (p−n); and Repetition determining means 24 for determining the number of repetitions of the irreversible function F necessary for changing from the renewed key K1(p), stored in the first device 7 and bearing the sequential number (p), to the key K2(p−n) stored in the second device and bearing a lower sequential number (p−n).

These repetition determining means 24 are linked to the repetition means 13 for repeating the function F before proceeding to a comparison of the keys K1, K2 and they may be linked to the storage means 22 of the device 7, and used in conjunction with the storage means 23 of the device 8 in order to take the stored sequential numbers from the latter.

Anyone experienced in this art may choose the components necessary for establishing the security system 6, including for instance the storage and reading devices for the different means of storage and memorization 17, 18 and 23 of the electronic purse card 1.

It must be understood that the invention is not at all limited to the forms of implementation described and that many modifications could be made to them without departing from the framework of this invention. For example, only the means of linking up (not shown) with the electronic purse 1 for its validation and reloading need to remain in the reloading terminal 3. At least one part of the other means referred to, those for storage 11, repetition 13, comparison 14, barring access 15, replacement 16, loading 19, numbering 21B and/or memorization 22, could in fact be deployed in the management center 5 and in this case the means 21A and 21B would only be made up of the means 21A. This may be preferable because the loading terminals 3 are usually constantly on line with the management center 5.

Preferably the comparison of the keys K1 and K2 is not direct, but takes place by means of a normal coding technique, for instance through the so called "challenge-response" technique or through one of the techniques defined in the international standards ISO/IEC 9798-2 or pr EN1546, with which a person experienced in this art would be familiar.

We claim:

1. A process for verifying the validity of a key K2 using a renewable key K1, the process comprising:

renewing the key K1, wherein a renewed key K1(p) is linked to a preceding key K1(p−1) in accordance with an irreversible function F such that K1(p−1)=F[K1(p)];

first comparing the renewed key K1(p) with a key K2(p−n); and if the first comparing step does not verify the validity of the key K2(p−n), then subsequently comparing a preceding key K1(p−k) with the key K2(p−n), where k is an integer greater than or equal to zero.

2. The process of claim 1 further comprising: successively renewing the key K1.

3. The process of claim 1 wherein k≦m and m is a fixed positive integer.

4. The process of claim 1 further comprising:

if the subsequent comparing step does not verify the validity of the key K2(p−k), then comparing a preceding key K1(p−j) with the key K2(p−n) for one or more positive integer values of j satisfying the relations 1≦j≦m where m is a fixed positive integer and j≠k.

5. The process of claim 4 wherein k=1 and the comparing steps are performed iteratively in increasing order of j.

6. The process of claim 4 further comprising:

if a comparing step verifies the validity of a key K2(p−j) for some value of j, then terminating the comparing steps.

7. The process of claim 1 wherein the key K1 is associated with a first device and the key K2 is associated with a second device, the process further comprising:

barring the second device from access to the first device, if all the comparing steps do not verify the validity of the key K2(p−k).

8. The process of claim 1 wherein the key K1 is associated with a first device and the key K2 is associated with a second device, the process further comprising:

granting the second device access to the first device, if a comparing step verifies the validity of the key K2(p−k).

9. The process of claim 8 further comprising:

replacing the key K2(p−k) with a more recent key.

10. The process of claim 9 wherein the more recent key is K2(p−1).

11. The process of claim 1 wherein the key K1 is associated with a first device and the key K2 is associated with a second device, and the second device is selected from the group consisting of an electronic purse, a debit card, a credit card, a smart card, and a chip card.

12. The process of claim 1 wherein the key K1 is associated with a first device and the key K2 is associated with a second device, and wherein the first device is selected from the group consisting of a payment terminal and a reloading terminal.

13. The process of claim 1 wherein the key K1 is a global key.

14. A system for verifying the validity of a key K2 of a second device using a renewable key K1 of a first device, the system comprising:

a second device comprising means for storing a version of the key K2; and a first device comprising:

key storage means for storing a version of the key K1;

renewing means, linked to the key storage means, for producing a renewed version of the key K1, wherein the a previous version of the key K1 can be obtained by operating upon the renewed version of the key K1 with an irreversible function F; and comparison means, connectable to the second device, for comparing the stored version of the key K2 to the renewed key K1 and one or more previous versions of the key K1.

15. The system of claim 14 wherein the first device further comprises:

replacement means for replacing the key K2 in the second device with a more recent key.

16. The system of claim 14 wherein the first device further comprises:

repeating means, linked to the key storage means, the renewing means and the comparison means, for repeating the irreversible function F in order to determine the one or more previous versions of the key K1.

17. The system of claim 16 wherein the first device further comprises:

numbering means for numbering each renewed key;

number storage means for storing at least the sequential number of the last key; and repetition determining means, linked to the numbering means, number storage means and the repeating means, for determining a number of repetitions of the irreversible function F.

18. The system of claim 14 wherein the first device further comprises:

a management central comprising the renewing means; and a terminal comprising the key storage means and the comparison means.

19. The system of claim 18 wherein the terminal is selected from the group consisting of a payment terminal and a reloading terminal.

20. The system of claim 18 wherein the first device further comprises:

a communication link between the management center and the terminal.

* * * * *